United States Patent
Ju

[11] Patent Number: 5,928,809
[45] Date of Patent: Jul. 27, 1999

[54] BATTERY HOLDER FOR A MOBILE TELEPHONE

[76] Inventor: Ming Lang Ju, No. 335, Jing Miang Road, Tou Cheng Jang, Yi Lan Shiang, Taiwan

[21] Appl. No.: 08/958,215

[22] Filed: Oct. 27, 1997

[51] Int. Cl.[6] .............................. H01M 2/10; H04B 1/38
[52] U.S. Cl. ............................. 429/100; 429/96; 429/99; 455/572
[58] Field of Search ............................. 429/96–100, 123; 455/90, 550, 572, 575

[56] References Cited

U.S. PATENT DOCUMENTS

| | | | |
|---|---|---|---|
| 5,290,639 | 3/1994 | Mallory | 429/1 |
| 5,384,207 | 1/1995 | Ohtani | 429/99 X |
| 5,535,437 | 7/1996 | Karl et al. | 429/97 X |
| 5,564,078 | 10/1996 | Nagai | 455/90 X |
| 5,600,223 | 2/1997 | Shirai | 429/100 X |
| 5,604,050 | 2/1997 | Brunette et al. | 429/97 |
| 5,642,404 | 6/1997 | Hsu | 455/90 X |
| 5,706,332 | 1/1998 | Nagai | 459/90 X |
| 5,738,954 | 4/1998 | Latella et al. | 429/97 |

*Primary Examiner*—John S. Maples
*Attorney, Agent, or Firm*—Bacon & Thomas, PLLC

[57] ABSTRACT

A battery holder including a casing fastened to a back side of a mobile telephone to hold a battery for providing the necessary working voltage to the mobile telephone, and a cover plate pivoted to the casing, wherein the casing has a retaining flange downwardly extended from its top side; the cover plate has a bottom side pivoted to a bottom side of the casing, and a springy retaining strip integral with its top side, the springy retaining strip having a triangular retaining block which is forced into engagement with the retaining flange of the casing to hold the cover plate in place when the cover plate is closed on the casing.

2 Claims, 5 Drawing Sheets

5,928,809

BATTERY HOLDER FOR A MOBILE TELEPHONE

BACKGROUND OF THE INVENTION

The present invention relates to a battery holder for a mobile telephone, and more particularly to such a battery holder which is fastened to a mobile telephone at its back side, and can be conveniently opened for replacement of battery.

Regular mobile telephones are commonly mounted with a rechargeable battery for providing the necessary working voltage. Because the rechargeable battery of a regular mobile telephone is fixedly installed on the inside of the housing of the mobile telephone, the user cannot replace the rechargeable battery when battery power is low. If there is no battery charger or power source available when the battery power of the rechargeable battery is low, the mobile telephone cannot work.

SUMMARY OF THE INVENTION

It is the main object of the present invention to provide a battery holder for a mobile telephone which allows the user to replace the battery conveniently. According to the present invention, the battery holder comprises a casing fastened to a back side of a mobile telephone to hold a battery for providing the necessary working voltage to the mobile telephone, and a cover plate covered on a front opening of the casing. The casing has a bottom side, a top side, and a retaining flange downwardly extended from its top side. The cover plate has a bottom side pivoted to the bottom side of the casing, and a springy retaining strip integral with its top side, the springy retaining strip having a triangular retaining block which is forced into engagement with the retaining flange of the casing to hold the cover plate in place when the cover plate is closed on the casing.

DETAILED DESCRIPTION OF THE PREFERRED EMBODIMENT

Figure 1:
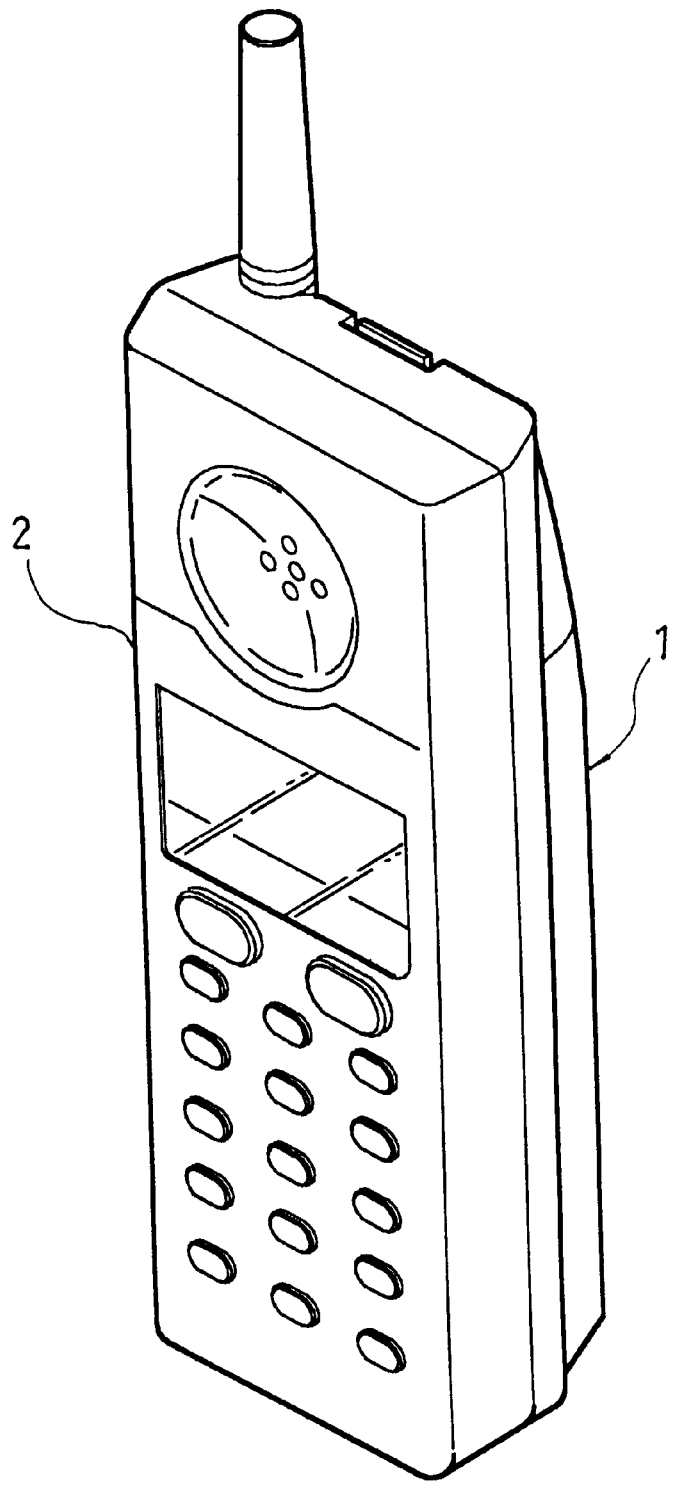
FIG. 1 is an elevational view showing a battery holder fastened to a mobile telephone according to the present invention.

Referring to Figures from 1 to 3, a battery holder 1 is made in the shape of a rectangular box and fastened to a mobile telephone 2 at its back side. The battery holder 1 holds a battery which provides the necessary working voltage to the mobile telephone 2, and is comprised of a casing 11, and a cover plate 12. The casing 11 and the cover plate 12 have a respective bottom side pivoted to each other, so that the cover plate 12 can be turned outwards to open the casing 11, or inwards to close the casing 11. The casing 11 has a retaining flange 111 downwardly extended from its front side at the top. The cover plate 12 has a springy retaining strip 121 at its top side in the middle. When the cover plate 12 is closed on the casing 11, the springy retaining strip 121 is forced into engagement with the retaining flange 111 of the casing 11, and therefore the cover plate 12 is retained in the closed position.

Figure 4:
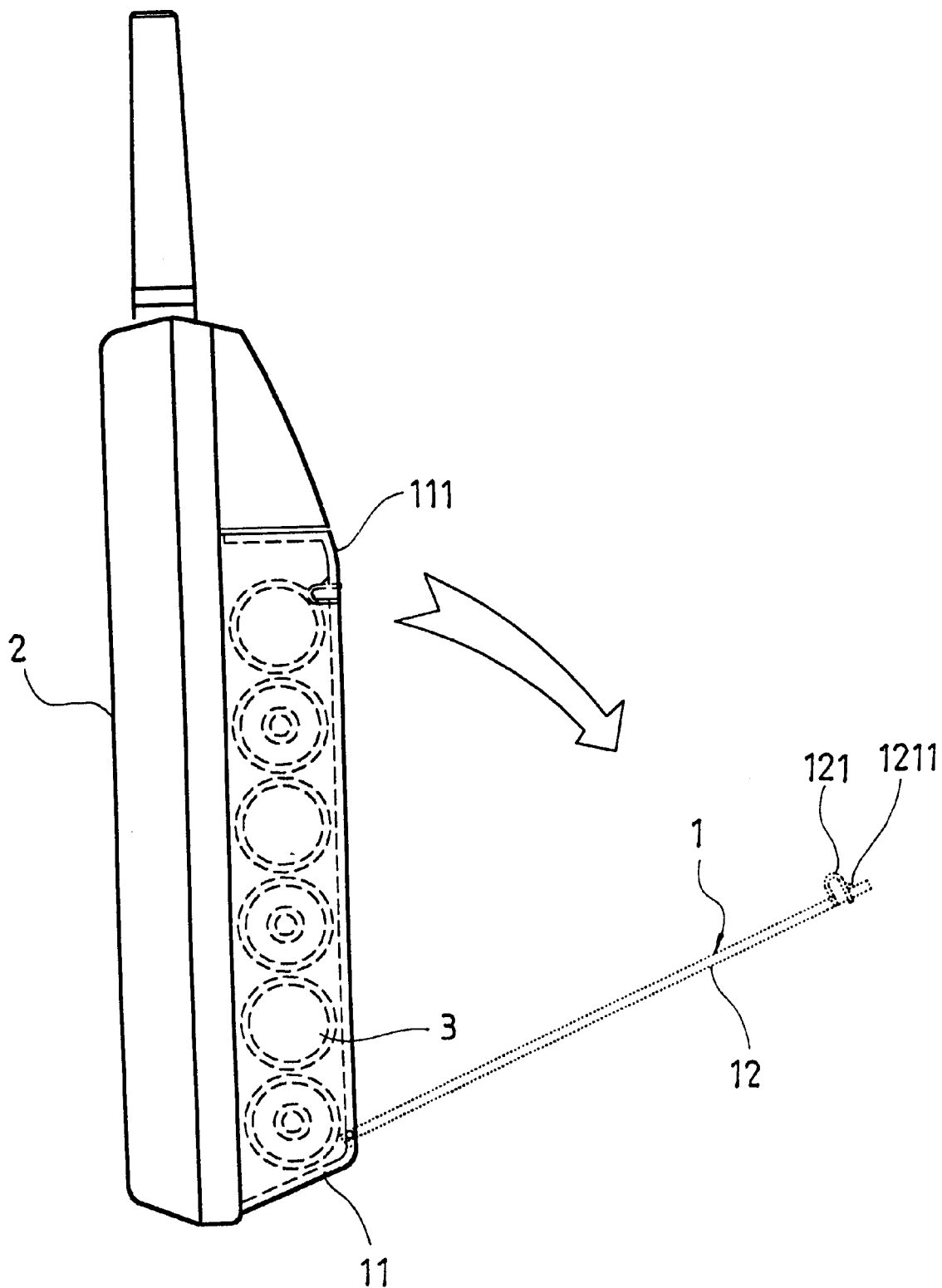
FIG. 4 is a sectional view showing the cover plate of the battery holder opened according to the present invention.

Referring to FIG. 4, the springy retaining strip 121 is cut from the cover plate 12 and bent into a substantially arched shape, having a retainer block 1211 raised from its top side and shaped like a right triangle. When battery 3 is loaded in the casing 11, the cover plate 12 is closed, and the retainer block 1211 of the springy retaining strip 121 of the cover plate 12 is forced into engagement with the retaining flange 111 of the casing 11, and therefore the cover plate 12 is retained in the closed position. When the springy retaining strip 121 is pressed down, the retainer block 1211 is disengaged from retaining flange 111 of the casing 11, and therefore the cover plate 12 is opened from the casing 11.

Figure 2:
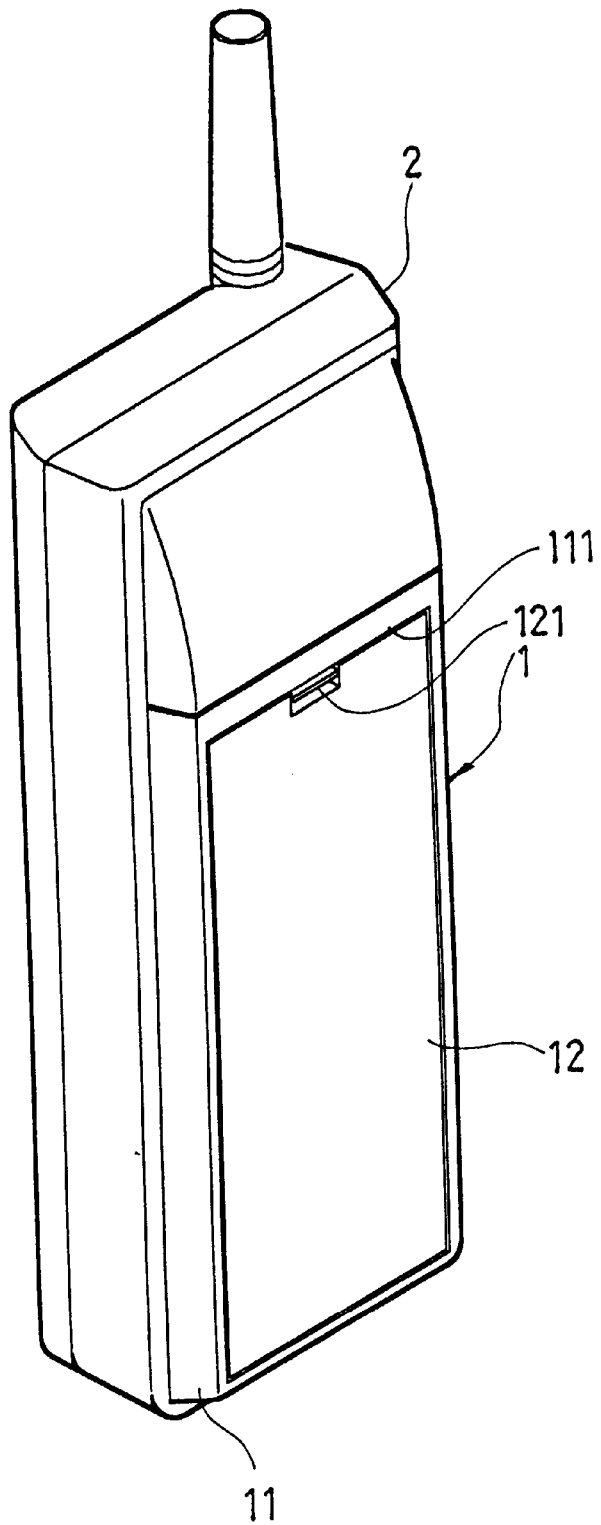
FIG. 2 is another elevational view of the mobile telephone shown in FIG. 1, showing the battery holder closed.
Figure 3:
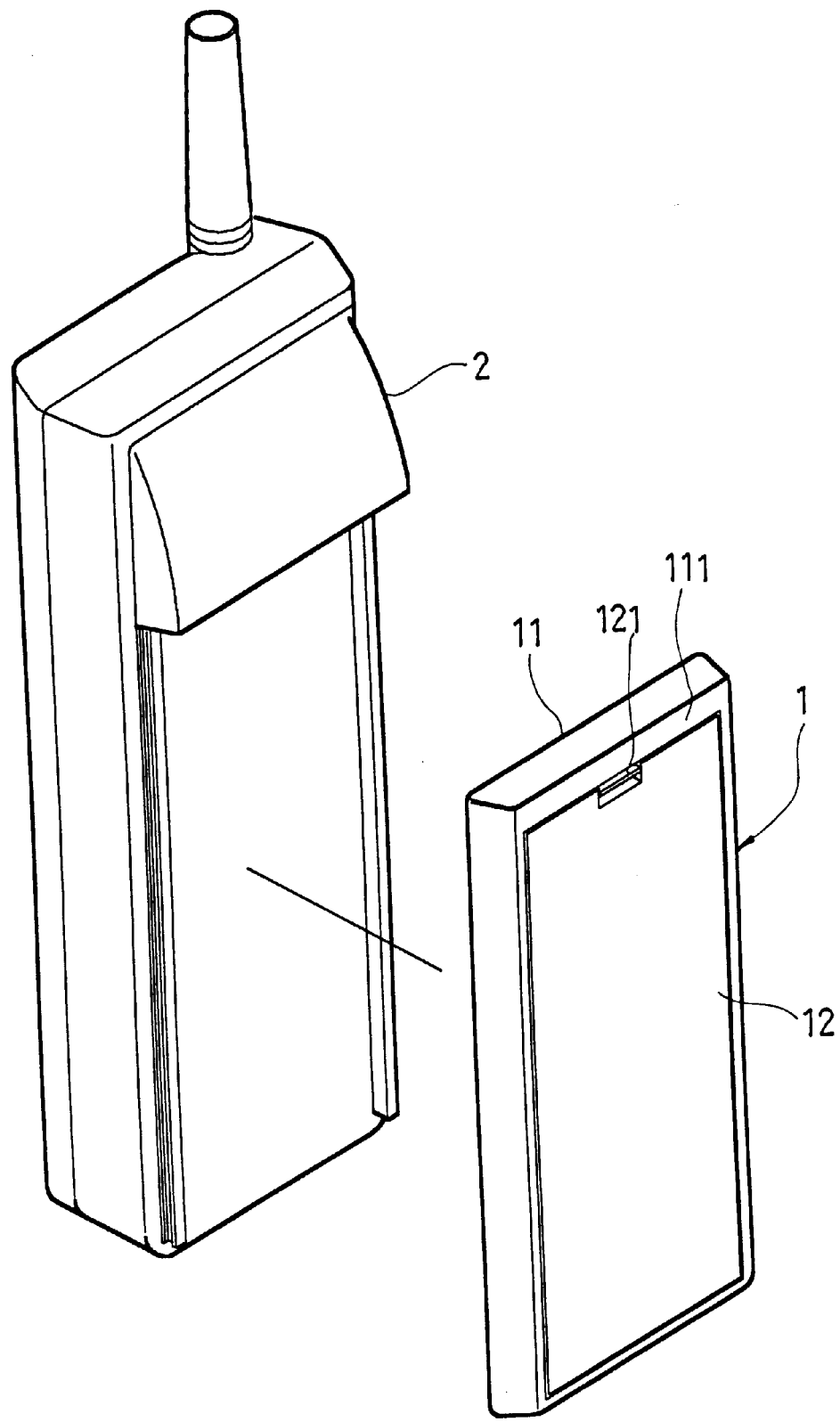
FIG. 3 shows the battery holder detached from the mobile telephone according to the present invention.
Figure 5:
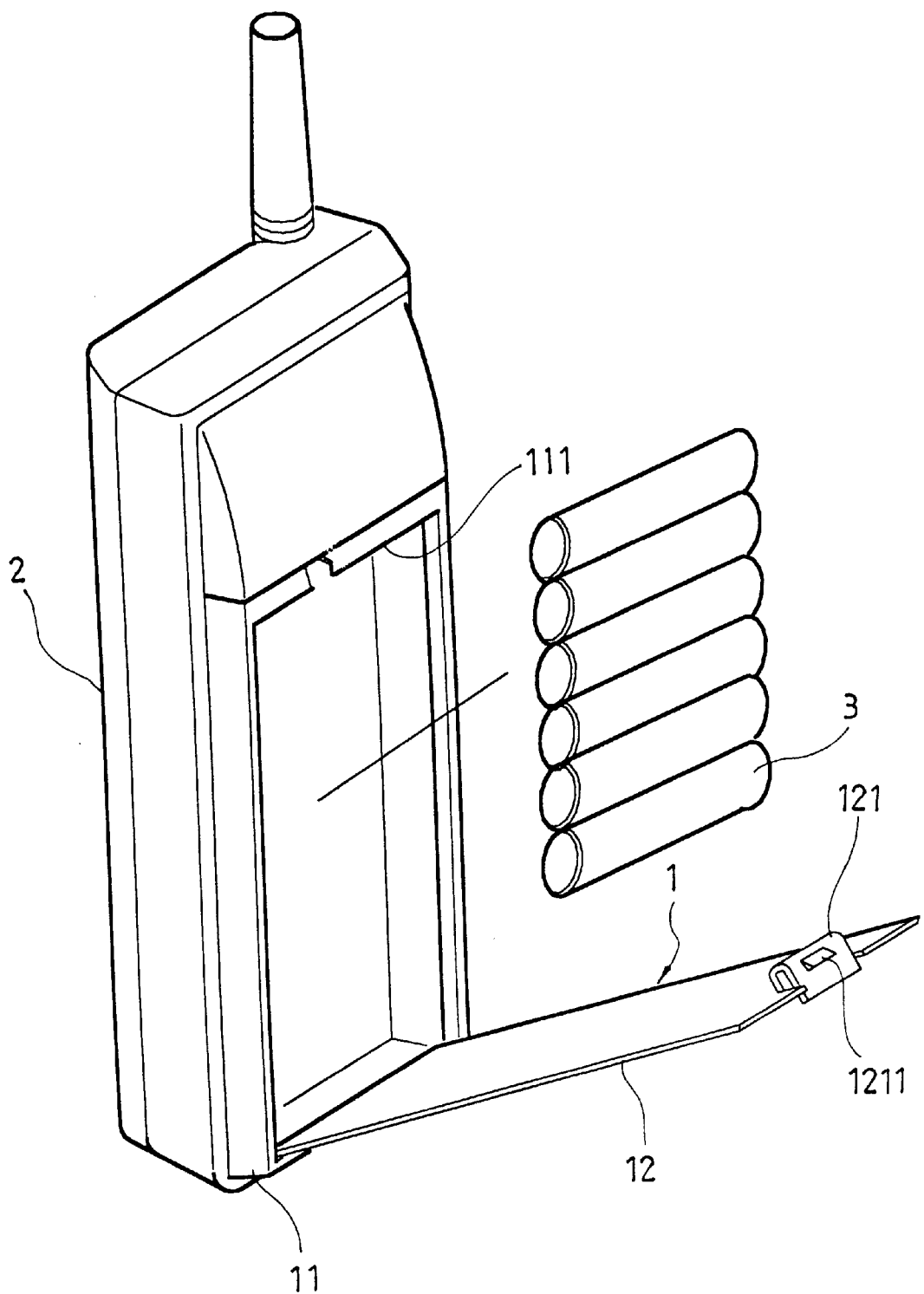
FIG. 5 shows the cover plate of the battery holder opened from the casing, and the battery taken out of the battery holder according to the present invention.

Referring to FIG. 5 and FIGS. 2 and 4 again, the retainer block 1211 has a sloping front side and a vertical rear side. When the cover plate 12 is closed on the casing 11, the sloping front side of the retainer block 1211 is moved over the retaining flange 111 of the casing 11, thereby causing the vertical rear side of the retainer block 1211 to be forced into engagement with the retaining flange 111 of the casing 11. When the springy retaining strip 121 is pressed down, the retainer block 1211 is lowered and disengaged from the retaining flange 111 of the casing 11, and therefore the cover plate 12 is opened from the casing 11 for a replacement of the battery 3.

While only one embodiment of the present invention has been shown and described, it will be understood that various modifications and changes could be made thereunto without departing from the spirit and scope of the invention disclosed.

What the invention claimed is:

1. A battery holder comprising a casing fastened to a back side of a mobile telephone to hold a battery for providing the necessary working voltage to said mobile telephone, and a cover plate covered on a front opening of said casing, wherein said casing comprises a bottom end, a top end, and a retaining flange downwardly extended from the top end of said casing;

said cover plate has a bottom end pivoted to the bottom end of said casing, a top end, and a springy retaining strip integral with the top end of said cover plate, said springy retaining strip having a retaining portion which is forced into engagement with the retaining flange of said casing to hold said cover plate in place when said cover plate is closed on said casing; wherein said springy retaining strip is formed by being cut from the top end of said cover plate and bent into a substantially arched shape.

2. The battery holder of claim 1, wherein said retainer portion of said springy retaining strip is shaped like a right triangle.

* * * * *